US011295352B2

(12) United States Patent
Li

(10) Patent No.: US 11,295,352 B2
(45) Date of Patent: Apr. 5, 2022

(54) METHOD FOR DISPLAYING PRODUCT INFORMATION FOR ELECTRONIC PRICE TAG, AND ELECTRONIC PRICE TAG

(71) Applicant: BOE TECHNOLOGY GROUP CO., LTD., Beijing (CN)

(72) Inventor: Xin Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 37 days.

(21) Appl. No.: 16/753,169

(22) PCT Filed: Aug. 22, 2019

(86) PCT No.: PCT/CN2019/101967
§ 371 (c)(1),
(2) Date: Apr. 2, 2020

(87) PCT Pub. No.: WO2020/048321
PCT Pub. Date: Mar. 12, 2020

(65) Prior Publication Data
US 2021/0042801 A1 Feb. 11, 2021

(30) Foreign Application Priority Data
Sep. 4, 2018 (CN) .......................... 201811025076.4

(51) Int. Cl.
G06Q 30/02 (2012.01)
G06K 7/10 (2006.01)
(Continued)

(52) U.S. Cl.
CPC ....... G06Q 30/0281 (2013.01); G06K 7/1095 (2013.01); G06K 7/1417 (2013.01);
(Continued)

(58) Field of Classification Search
CPC ............. G06Q 30/0281; G06Q 10/087; G06Q 20/3276; G06Q 30/0631; G06Q 20/201;
(Continued)

(56) References Cited

U.S. PATENT DOCUMENTS 8,556,172 B2* 10/2013 Nakamura ............... G07G 1/12
235/385
9,679,310 B1* 6/2017 Saltzstein ............... G06F 3/043
(Continued)

FOREIGN PATENT DOCUMENTS

CN 1881270 A 12/2006
CN 102341830 A 2/2012
(Continued)

OTHER PUBLICATIONS

Office Action of CN Application No. 201811025076.4, dated Aug. 18, 2020, 33 pages.
(Continued)

Primary Examiner — Sonji N Johnson
(74) Attorney, Agent, or Firm — Muncy, Geissler, Olds & Lowe, P.C.

(57) ABSTRACT

A method for displaying product information for an electronic price tag includes: displaying a piece of first product information of at least one first product in an area where the electronic price tag is located, the first product information comprising at least one of name information and price information of the first product; and receiving a trigger instruction and displaying at least one piece of second product information of a second product, the second product being (i) at least one product each associated with the first product and having a discounted price, or (ii) at least one product each associated with the first product and having a discounted total price incurred when purchased together with the first product, the second product information com-
(Continued)

prising at least one of name information, price information, and location information of the second product.

18 Claims, 3 Drawing Sheets

(51) Int. Cl.
　　*G06K 7/14*　　　　(2006.01)
　　*G06K 19/06*　　　(2006.01)
　　*G06Q 10/08*　　　(2012.01)
　　*G06Q 20/32*　　　(2012.01)
　　*G06Q 30/06*　　　(2012.01)
(52) U.S. Cl.
　　CPC ..... *G06K 19/06037* (2013.01); *G06Q 10/087* (2013.01); *G06Q 20/3276* (2013.01); *G06Q 30/0631* (2013.01)
(58) Field of Classification Search
　　CPC .... G06Q 20/208; G06Q 20/387; G06Q 30/06; G06K 7/1095; G06K 7/1417; G06K 19/06037; G07G 1/0036; G09F 3/02
　　See application file for complete search history.

(56) References Cited

U.S. PATENT DOCUMENTS

| 2006/0283942 | A1 | 12/2006 | Nagamachi |
| 2008/0284566 | A1 | 11/2008 | Zai et al. |
| 2012/0133623 | A1* | 5/2012 | Byun ...................... G09G 3/20 345/207 |
| 2013/0041742 | A1 | 2/2013 | Zhang et al. |
| 2014/0258028 | A1 | 9/2014 | Bynum et al. |
| 2015/0178767 | A1 | 6/2015 | Wu et al. |
| 2015/0179129 | A1* | 6/2015 | Byun ...................... G06Q 30/06 345/520 |
| 2015/0324745 | A1* | 11/2015 | Goodall ................ G06Q 10/08 705/337 |
| 2016/0196575 | A1 | 7/2016 | Uchida et al. |
| 2018/0068379 | A1* | 3/2018 | Bynum .............. G01C 21/3484 |
| 2018/0165670 | A1* | 6/2018 | Bacallao ............ G07G 1/0036 |
| 2019/0251408 | A1 | 8/2019 | Guan |

FOREIGN PATENT DOCUMENTS

| CN | 104732174 A | 6/2015 |
| CN | 104732403 A | 6/2015 |
| CN | 105164720 A | 12/2015 |
| CN | 105580040 A | 5/2016 |
| CN | 105809218 A | 7/2016 |
| CN | 106850764 A | 6/2017 |
| CN | 106991578 A | 7/2017 |
| CN | 107133823 A | 9/2017 |
| CN | 107154109 A | 9/2017 |
| CN | 108335148 A | 7/2018 |
| CN | 108364047 A | 8/2018 |
| CN | 109754302 A | 5/2019 |
| JP | 2013054539 A | 3/2013 |
| KR | 20140127558 A | 11/2014 |
| WO | WO-2011088749 A1 | 7/2011 |

OTHER PUBLICATIONS

International Search Report of PCT/CN2019/101967 and English translation, dated Nov. 25, 2019, 15 pages.

* cited by examiner

METHOD FOR DISPLAYING PRODUCT INFORMATION FOR ELECTRONIC PRICE TAG, AND ELECTRONIC PRICE TAG

CROSS-REFERENCE TO RELATED APPLICATIONS

The present application is the U.S. national phase of PCT Application No. PCT/CN2019/101967 filed on Aug. 22, 2019, which claims the priority of the Chinese Patent Application No. 201811025076.4 filed on Sep. 4, 2018, which are incorporated herein by reference in their entirety.

TECHNICAL FIELD

The present disclosure relates to the field of communication technology, and in particular to a method for displaying product information for an electronic price tag, and the electronic price tag.

BACKGROUND

Currently, if a product recommending or purchasing solution can be designed for customers, it will greatly improve the customers' shopping experience. Therefore, there is a need in related art to provide a novel product display method for improving the customers' shopping experience.

SUMMARY

In a first aspect, embodiments of the present disclosure provide a method for displaying product information for an electronic price tag, which includes: displaying at least one piece of first product information of at least one first product in an area where the electronic price tag is located, the at least one piece of first product information including at least one of name information and price information of the at least one first product; and receiving a trigger instruction and displaying at least one piece of second product information of at least one second product, the at least one second product being (i) at least one product each associated with the first product and having a discounted price, or (ii) at least one product each associated with the first product and having a discounted total price incurred when purchased together with the first product, and the at least one piece of second product information including at least one of name information, price information, and location information of the at least one second product.

According to some embodiments of the present disclosure, the at least one piece of first product information includes the name information and the price information of the at least one first product.

According to some embodiments of the present disclosure, the at least one piece of second product information includes the name information, the price information, and the location information of the at least one second product.

According to some embodiments of the present disclosure, the method further includes determining a target response object according to a position of the electronic price tag when receiving a first input operation; and transmitting a notification message to the target response object.

According to some embodiments of the present disclosure, the determining the target response object according to the position of the electronic price tag includes taking one of response objects obtained in advance, which is closest to the position of the electronic price tag, as the target response object, or taking one of response objects obtained in advance, which is arranged corresponding to the position of the electronic price tag, as the target response object.

According to some embodiments of the present disclosure, the displaying the at least one piece of second product information of the at least one second product includes: displaying a plurality of pieces of the second product information of a plurality of the second products sequentially when there is the plurality of the second products.

According to some embodiments of the present disclosure, the method further includes switching the second product information of the second product which is currently displayed on the electronic price tag to the second product information of another one of the plurality of the second products when receiving a second input operation.

According to some embodiments of the present disclosure, the method further includes displaying at least one piece of comments information of the second product which is currently displayed on the electronic price tag when receiving a third input operation.

According to some embodiments of the present disclosure, the location information includes a two-dimensional code of a destination address where the second product is stored.

According to some embodiments of the present disclosure, the at least one piece of second product information further includes at least one piece of scan code payment information of the at least one second product, and the or each piece of scan code payment information includes a two-dimensional code for payment provided for a mobile terminal.

According to some embodiments of the present disclosure, the trigger instruction is obtained by a sensor provided in the electronic price tag or on a shelf.

In a second aspect, the present disclosure further provides an electronic price tag, including: a first display configured to display at least one piece of first product information of at least one first product in an area where the electronic price tag is located, the at least one piece of first product information including at least one of name information and price information of the at least one first product; a trigger instruction receiver configured to receive a trigger instruction and transmit a display instruction according to the trigger instruction; and a second display configured to respond to the display instruction and display at least one piece of second product information of at least one second product, the at least one second product being (i) at least one product each associated with the first product and having a discounted price, or (ii) at least one product each associated with the first product and having a discounted total price incurred when purchased together with the first product, the at least one piece of second product information including at least one of name information, price information, and location information of the second product.

According to some embodiments of the present disclosure, the at least one piece of first product information includes the name information and the price information of the at least one first product.

According to some embodiments of the present disclosure, the at least one piece of second product information includes the name information, the price information, and the location information of the at least one second product.

According to some embodiments of the present disclosure, the electronic price tag further includes a target response object determining device configured to determine a target response object according to a position of the electronic price tag when receiving a first input operation;

and a notification message transmitter configured to transmit a notification message to the target response object.

According to some embodiments of the present disclosure, the target response object determining device is further configured to take one of response objects obtained in advance, which is closest to the position of the electronic price tag, as the target response object, or to take one of response objects obtained in advance, which is arranged corresponding to the position of the electronic price tag, as the target response object.

According to some embodiments of the present disclosure, the second display is further configured to display a plurality of pieces of the second product information of a plurality of the second products sequentially when there is the plurality of the second products.

According to some embodiments of the present disclosure, the electronic price tag further includes a switcher configured to switch the second product information of the second product which is currently displayed on the electronic price tag to the second product information of another one of the plurality of the second products when receiving a second input operation.

According to some embodiments of the present disclosure, the electronic price tag further includes an comments information display configured to display at least one piece of comments information of the second product which is currently displayed on the electronic price tag when receiving a third input operation.

According to some embodiments of the present disclosure, the location information includes a two-dimensional code of a destination address where the second product is stored.

According to some embodiments of the present disclosure, the at least one piece of second product information further includes at least one piece of scan code payment information of the at least one second product, and the or each piece of scan code payment information includes a two-dimensional code for payment provided for a mobile terminal.

According to some embodiments of the present disclosure, the trigger instruction is obtained by a sensor provided in the electronic price tag or on a shelf.

In a third aspect, embodiments of the present disclosure provide an electronic price tag including a memory, a processor, and a computer program stored on the memory and capable of running on the processor, wherein when executed by the processor, the computer program implements steps of the method for displaying product information as described in the first aspect.

In a fourth aspect, embodiments of the present disclosure further provide a computer-readable storage medium, having a computer program stored thereon, wherein when executed by the processor, the computer program implements steps of the method for displaying product information as described in the first aspect.

BRIEF DESCRIPTION OF THE DRAWINGS

In order to illustrate the embodiments of the present disclosure or the technical solutions in the related art more apparently, the accompanying drawings required in the description of the embodiments will be briefly introduced below. It is evident that the drawings used in the following description relate to only some embodiments of the present disclosure, and based on these drawings, the other drawings can be obtained by those of ordinary skill in the art without exercising any creative work.

DETAILED DESCRIPTION

In order to make the technical problems to be solved, technical solutions, and advantages of the embodiments of the present disclosure more apparent, detailed description will be set forth with reference to the accompanying drawings and specific embodiments.

In the case of product (merchandise) sale in a conventional physical supermarket, consumers select at least one product from one or more shelves by themselves. For products that consumers often purchase together, they may be placed in different product areas because they belong to different categories. For example, a consumer will choose to purchase beer and fried chicken nuggets at the same time, but beer and fried chicken nuggets tend not to be placed in a same area of a shopping mall. As a result, the consumer needs to purchase the beer and the fried chicken nuggets separately, and thus has poor shopping experience. In addition, customers may not expect to purchase beer when they purchase fried chicken nuggets. In view of this, if a product recommending or purchasing solution can be designed for the customers, it will greatly improve the customers' shopping experience.

Therefore, it is necessary to design a product display method to improve the customers' shopping experience.

Figure 1:
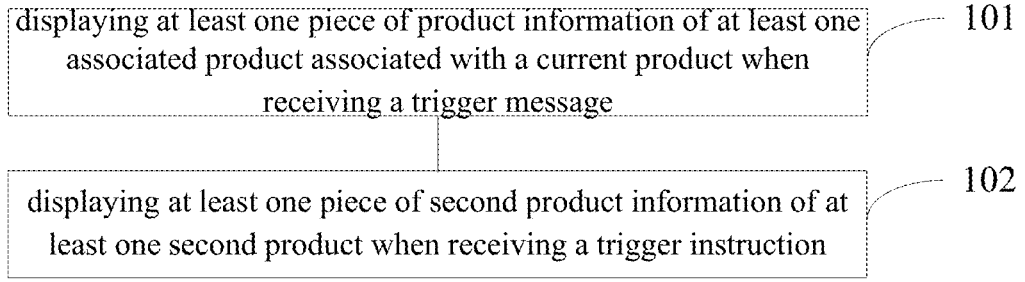
FIG. 1 is a first flowchart of a method for displaying product information for an electronic price tag provided in embodiments of the present disclosure.

Reference is made to FIG. 1 which is a flowchart of a method for displaying product information for an electronic price tag provided by embodiments of the present disclosure. As a non-limiting example, as shown in FIG. 1, the method for displaying the product information for the electronic price tag provided by the embodiments of the present disclosure is applied to an electronic price tag, and includes the following steps.

In step 101, at least one piece of first product information of at least one first product in an area where the electronic price tag is located is displayed, and the at least one piece of first product information includes at least one of name information and price information of the at least one first product. The electronic price tag is configured to display the product information, and for each first product, a corresponding electronic price tag configured to display at least one piece of first product information of the corresponding first product should be provided. The at least one piece of first product information includes, for example, at least one of name information and price information of the at least one first product. Of course, a plurality of the first products can also share a same electronic price tag. That is, one electronic price tag can be used to display a plurality of pieces of first product information of the plurality of the first products in a nearby area so as to save cost.

The name information and the price information of the first product are a product name and a product price of the first product, respectively. Certainly, the first product information can also include other information according to actual needs, such as stock quantity information of the first products, information of remaining period of validity, and manufacturer related information, and the embodiments of the present disclosure are not limited thereto.

In step 102, a trigger instruction is received and at least one piece of second product information of at least one second product is displayed. The at least one second product is (i) at least one product each associated with the first product and having a discounted price, or (ii) at least one product each associated with the first product and having a discounted total price incurred when purchased together with the first product, and the at least one piece of second product information includes at least name information, price information, and location information of the at least one second product.

The electronic price tag can further display the at least one piece of second product information of the at least one second product each associated with the first product. The at least one second product is (i) at least one product each associated with the first product and having a discounted price, or (ii) at least one product each associated with the first product and having a discounted total price incurred when purchased together with the first product.

The second product associated with the first product includes a product sold in combination with the first product. By way of example, for fried chicken and beer, the beer is a product associated with the fried chicken, and at the same time, the fried chicken is also a product associated with the beer. When the first product is beer, if the fried chicken has a discounted price, then the fried chicken is the product associated with the beer and having the discounted price, that is, the fried chicken is the second product. When the fried chicken does not have a discounted price, but if there is a discount on a total price when it is purchased together with the beer, then the fried chicken is also considered as the second product at this time. The electronic price tag displays the second product information of the second product.

It should be noted that there is no fixed sequence between step 101 and step 102, and the first product information can be displayed after the second product information has been displayed. Alternatively, the second product information can be displayed with the first product information at the same time. For example, when a trigger instruction is received, the second product information of the second product is displayed, and the customer can cause the electronic price tag to display the first product information again by touching the electronic price tag. Alternatively, the electronic price tag displays the first product information after the second product information has been displayed for a predetermined period of time. Alternatively, it is specified in advance that the first product information and the second product information are displayed at the same time for a predetermined period of time.

In addition, regarding the way to display the first product information and the second product information, the first product information can be displayed at a highlighted display position, and the second display information displayed at a secondary display position. Alternatively, the second product information is displayed at a highlighted display position, and the first display information is displayed at a secondary display position. Alternatively, both the first product information and the second product information are displayed at highlighted display positions. In this regard, the embodiments of the present disclosure are not limited thereto.

When there is a plurality of the second products, a plurality of pieces of product information of the plurality of the second products is sequentially displayed. For example, when there are multiple second products, the second product information of each of the second products is displayed in a descending order of a level of benefit received when the second product is sold in combination with the first product, for example, for three seconds to five seconds each time, and the display period of time is not limited thereto. Specifically, a display period of time of the second product with a higher level of benefit can be set to be longer, and a display period of time of the second product with a lower level of benefit can be set to be shorter, so that the customers' attentions focus on the second product with the higher level of benefit.

In the process of shopping, a customer can view not only the first product information of the first product but also the second product information of the second product associated with the first product by means of the electronic price tag. The second product information includes name information, price information, and location information of the second product. The name information is a name of the second product, and the price information includes information such as a current price, whether or not there is a discount, and how much the discount is.

The location information of the second product is a location where the second product is stored, and which can be expressed through written description indicating an area where the second product is stored, a specific shelf name, and so on. By way of example, when the first product is beer, the electronic price tag provided corresponding to the first product shows that fried chicken nuggets (the second product) B are located on a shelf H. In this case, the customer can go to the corresponding location based on this location information to purchase the fried chicken nuggets, thereby saving the customer's time to find the fried chicken nuggets.

Alternatively, the location information can be displayed as an address code, which is a two-dimensional code of a destination address where the second product is stored. After the address code is scanned by the customer through an application software on a mobile terminal, a navigation route to the destination address can be shown on the mobile terminal. For example, the customer can scan the two-dimensional code of the destination address through a mobile phone to activate a built-in indoor positioning APP in the mobile phone, which can be a built-in module for shopping in supermarkets and shopping malls, or a third-party indoor navigation APP, so that the custom can navigate to the storage location of the second product via the mobile phone.

Specifically, the navigation can be implemented as follows: the mobile phone first detects its current location, extracts the destination address from the two-dimensional code of the destination address through a camera, then uses its current location as a starting point of a route and the destination address extracted from the two-dimensional code of the destination address as an end point of the route, and selects an available navigation route from the starting point of the route to the end point of the route in an electronic map.

The second product information further includes scan code payment information of the second product, which includes a payment code. The payment code is a two-dimensional code for payment provided for the mobile terminal, and a customer can pay for the second product through the payment code, for example, by scanning the payment code. After the payment is completed, the customer can pick up the second product at a designated place in the shopping mall. At this time, the customer does not need to go to the location where the second product is stored to pick up the product, which can simplify the customer's shopping steps and provide great convenience for the customer.

The trigger instruction is obtained by a sensor provided in the electronic price tag or on a shelf. The sensor is placed on the shelf, or built into the electronic price tag.

Generally, the electronic price tag is arranged beside its corresponding first product. When the customer approaches the electronic price tag, for example, when the customer's proximity to the electronic price tag is smaller than a threshold (for example, 0.2 m), the sensor in the electronic price tag, such as an image sensor or an infrared sensor, recognizes this behavior and determines that the customer has an intention of purchasing the first product. This determination result is a trigger instruction, and at this time, the electronic price tag will display at least one piece of second product information of the at least one second product for reference by the customer, so as to improve smart shopping experience.

In addition, the sensor can be arranged on the shelf rather than in the electronic price tag. When a customer picks up the first product, the sensor on the shelf, such as an image sensor, a pressure sensor, or an ultrasonic sensor, recognizes this action, and determines that the customer has an intention of purchasing the first product, and transmits the determination result to the electronic price tag. The determination result is a trigger instruction, and at this time, the electronic price tag will display at least one piece of second product information of the at least one second product.

In another embodiment of the present disclosure, the trigger instruction can be generated by a customer touching the electronic price tag. For example, a click operation or a sliding operation of the customer on the electronic price tag is used as the trigger instruction.

In the method for displaying product information in the embodiment of the present disclosure, the at least one piece of first product information of the at least one first product in the area where the electronic price tag is located is displayed, and the at least one piece of first product information includes at least the name information and the price information of the at least one first product; the trigger instruction is received, and the at least one piece of second product information of the at least one second product is displayed, and the at least one second product is (i) the at least one product each associated with the first product and having the discounted price, or (ii) the at least one product each associated with the first product and purchased together with the first product to obtain the discounted total price. In addition, the at least one piece of second product information includes at least the name information, the price information, and the location information of the at least one second product. By adopting this method, a customer can obtain the at least one piece of second product information of the at least one second product associated with the first product through the electronic price tag when shopping, so as to provide the customer with a purchase reference, which greatly improves the shopping experience of the customer.

Figure 2:
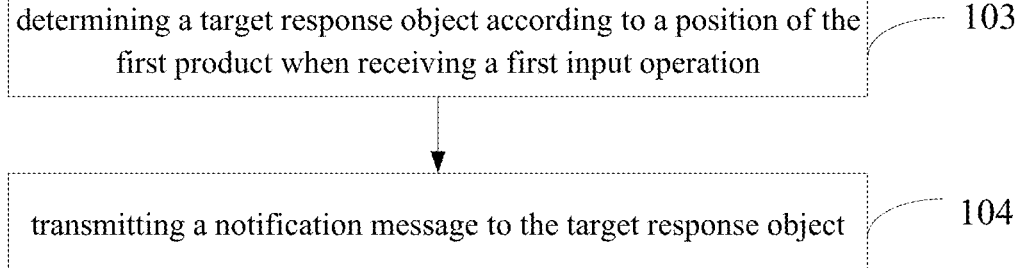
FIG. 2 is a second flowchart of a method for displaying product information for an electronic price tag provided in embodiments of the present disclosure.

In another embodiment of the present disclosure, as shown in FIG. 2, the method for display product information further includes, for example, a step 103 in which a target response object is determined according a position of the electronic price tag when a first input operation is received.

When customers need manual consultation, they can use the electronic price tag to remind a store staff to come and solve some problems. The electronic price tag can obtain a first input operation through a touch operation, gesture recognition, or voice recognition of a customer. When the electronic price tag receives the first input operation, it needs to transmit a notification message to the target response object.

The determination of the target response object includes, for example, taking one of response objects obtained in advance, which is closest to the position of the electronic price tag, as the target response object, or taking one of response objects obtained in advance, which is arranged corresponding to the position of the electronic price tag, as the target response object.

The response objects include store staffs, and each store staff carries a responder, which is used to receive the notification message. The responder also has a positioning function, and the electronic price tag can obtain the location of each store staff by receiving the location information sent by the responder, so that the electronic price tag can obtain a distance between each response object and the location of the electronic price tag, so as to take the response object at a distance closest to the position of the electronic price tag as the target response object. By using this method for determining the target response object, it is possible for the customer to get the help of a store staff in the shortest time so as to further improve the user experience. The responder can be a mobile phone, a smart watch, or a tablet computer, and is not limited here as long as it can receive the notification message.

In an area of a commercial supermarket, there will be one or more store staffs who are responsible for consulting in this area. That is, for the electronic price tag in this area, one or more corresponding store staffs will be arranged accordingly. When the electronic price tag in the area receives the first input operation, it will take one of the response objects obtained in advance, which is arranged corresponding to the position of the electronic price tag, as the target response object.

The response objects obtained in advance are, for example, response objects that are free or not very busy at this moment.

In step 104, a notification message is transmitted to the target response object.

After the target response object has been determined, the notification message is transmitted to the target response object, for example, the responder of the store staff, so as to inform the store staff that there is a customer consultation request that needs to be handled.

In this embodiment, when a customer needs manual consultation, a relevant store staff is notified via the electronic price tag to come and solve some problems, which is simple and convenient, and further improves the customer's shopping experience.

Figure 3:
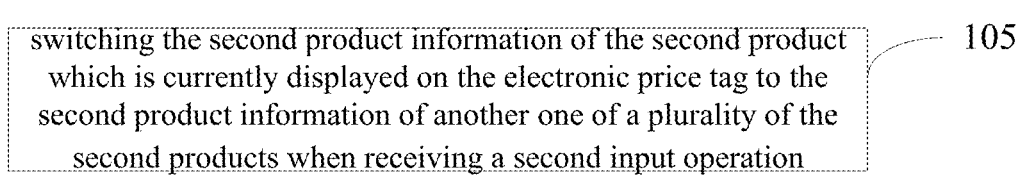
FIG. 3 is a third flowchart of a method for displaying product information for an electronic price tag provided in embodiments of the present disclosure.

In one embodiment of the present disclosure, as shown in FIG. 3, the method for displaying product information further includes, for example, a step 105 in which the second product information of the second product which is currently displayed on the electronic price tag is switched to the second product information of another one of the plurality of the second products when a second input operation is received.

Due to a limited screen size of the electronic price tag, when there is a plurality of the second products, the electronic price tag will sequentially display a plurality of pieces of second product information of the plurality of the second products, and each piece of the second product information is displayed for three seconds to five seconds. If the customer is not interested in the displayed second product information, or he/she wants to quickly browse all pieces of the second product information, the customer can switch the second product information currently displayed on the electronic price tag to another piece of second product information by a sliding or clicking operation, which can further improve the user's shopping experience. A touch operation such as the sliding operation or the clicking operation is a second input operation. The second input operation can further include a gesture operation or a voice operation.

Figure 4:
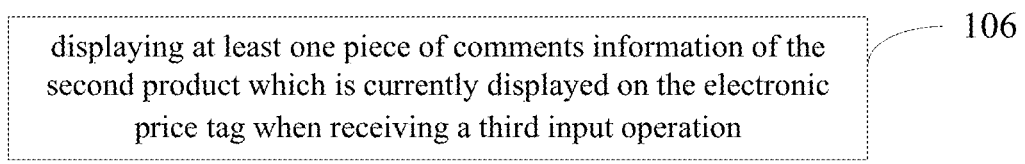
FIG. 4 is a fourth flowchart of a method for displaying product information for an electronic price tag provided in embodiments of the present disclosure.

In a yet another embodiment of the present disclosure, as shown in FIG. 4, the method for displaying product information can further include a step 106, in which at least one piece of comments information of the second product which is currently displayed on the electronic price tag is displayed when a third input operation is received.

The customer can obtain the at least one piece of comments information for the second product by inputting the third input operation to the electronic price tag.

There are three ways to generate the comments information: after purchasing the second product, the customer can make an evaluation on a corresponding supermarket APP, and the comments information is then synchronously pushed to the electronic price tag; or after the customer completes the payment by scanning the payment code on the electronic price tag, an evaluation option pops up on the electronic price tag, and the customer gives the comments information; or the comments information is made on a third-party online shopping website which is introduced.

The comments information helps customers to further understand the second product, provides more references for customers to decide whether to purchase the second product, and further improves the customer's shopping experience.

Figure 5:
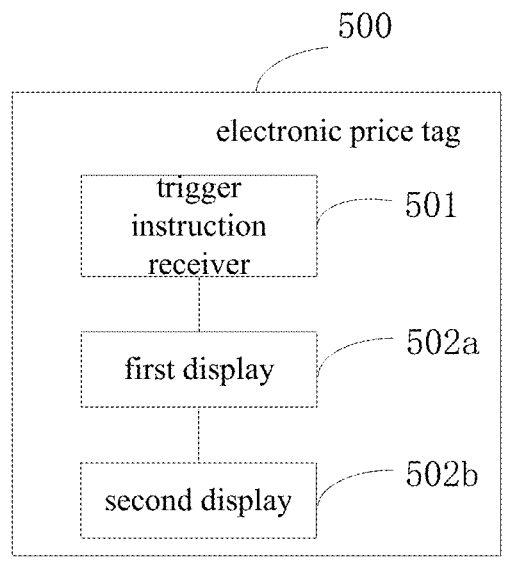
FIG. 5 is a first structural diagram of an electronic price tag provided in embodiments of the present disclosure.

Reference is made to FIG. 5, which is a structural diagram of an electronic price tag provided by embodiments of the present disclosure. As shown in FIG. 5, the electronic price tag 500 includes a trigger instruction receiver 501, a first display 502a, and a second display 502b.

The first display 502a is configured to display at least one piece of first product information of at least one first product in an area where the electronic price tag is located, and the at least one piece of first product information includes at least one of name information and price information of the at least one first product.

The trigger instruction receiver 501 is configured to receive a trigger instruction and transmit a display instruction according to the trigger instruction.

The second display 502b is configured to respond to the display instruction and display at least one piece of second product information of at least one second product, and the at least one second product is (i) at least one product each associated with the first product and having a discounted price, or (ii) at least one product each associated with the first product and having a discounted total price incurred when purchased together with the first product, and the at least one piece of second product information includes at least one of name information, price information, and location information of the at least one second product.

Further, the second product information includes scan code payment information of the second product, which includes a two-dimensional code for payment provided for the mobile terminal. The trigger instruction is obtained by a sensor provided in the electronic price tag or on a shelf.

The electronic price tag in the embodiment of the present disclosure displays the at least one piece of first product information of the at least one first product in the area where the electronic price tag is located, which includes at least the name information and the price information of the at least one first product, receives the trigger instruction, and displays the at least one piece of second product information of the at least one second product, wherein the at least one second product is (i) the at least one product each associated with the first product and having the discounted price, or (ii) the at least one product each associated with the first product and purchased together with the first product to obtain the discounted total price, and the at least one piece of second product information includes at least the name information, the price information, and the location information of the at least one second product. These settings enable a customer to obtain the at least one piece of second product information of the at least one second product associated with the first product through the electronic price tag of the at least one first product when shopping, thereby providing the customer with a purchase reference, and greatly improving the shopping experience of the customer.

Figure 6:
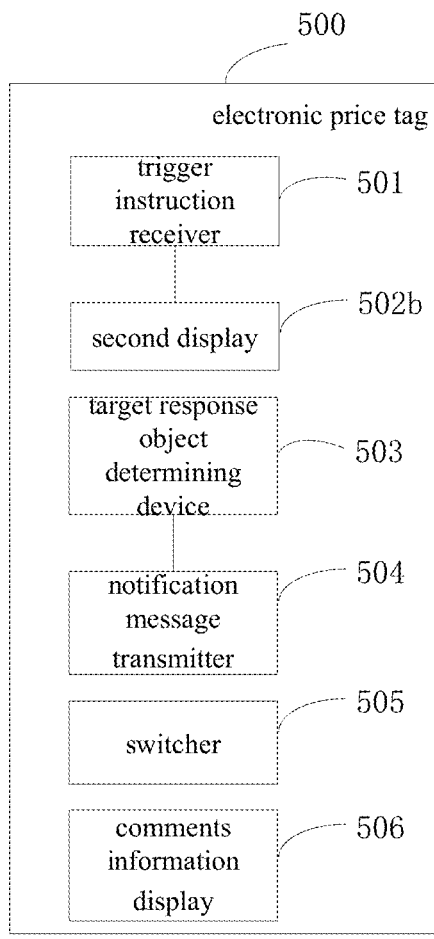
FIG. 6 is a second structural diagram of an electronic price tag provided in embodiments of the present disclosure.

Further, as shown in FIG. 6, the electronic price tag 500 further includes a target response object determining device 503 and a notification message transmitter 504.

The target response object determining device 503 is configured to determine a target response object according to a position of the electronic price tag.

The notification message transmitter 504 is configured to transmit a notification message to the target response object.

Further, the target response object determining device 503 is configured to take one of response objects obtained in advance, which is closest to the position of the electronic price tag, as the target response object, or to take one of response objects obtained in advance, which is arranged corresponding to the position of the electronic price tag, as the target response object.

Further, as shown in FIG. 6, the second display 502b is also configured to display a plurality of pieces of second product information of a plurality of second products sequentially when there is the plurality of the second products.

As shown in FIG. 6, the electronic price tag 500 can further includes a switcher 505 which is configured to switch the second product information of the second product which is currently displayed on the electronic price tag to the second product information of another one of the plurality of the second products when receiving a second input operation.

Further, as shown in FIG. 6, the electronic price tag 500 can further include an comments information display 506 which is configured to display at least one piece of comments information of the second product which is currently displayed on the electronic price tag when receiving a third input operation.

It should be noted that the electronic price tag 500 in the above embodiment can realize any one of the method embodiments shown in FIGS. 1 to 4. That is, any one of the method embodiments shown in FIGS. 1 to 4 can be implemented by the electronic price tag 500 of this embodiment, and same or similar advantageous effects can be achieved and will not be repeated here.

Figure 7:
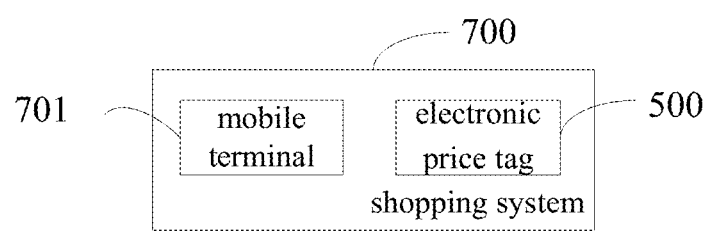
FIG. 7 is a structural diagram of a shopping system provided in embodiments of the present disclosure.

As shown in FIG. 7, an embodiment of the present invention further provides a shopping system 700, which includes, for example, a mobile terminal 701 and the electronic price tag 500 described in the foregoing embodiment. The mobile terminal 701 is configured to scan code payment information displayed on the electronic price tag 500 such that a second product corresponding to the scan code payment information is purchased.

Customers can purchase the displayed second product by scanning the scan code payment information (i.e., the payment code) displayed on the electronic price tag 500. After the payment is completed, a delivery staff of a supermarket or shopping mall will package the second product and deliver it to a specialized location in the supermarket or shopping mall. By way of example, a user wants to purchase promotional beer when purchasing fried chicken, and the delivery staff of the supermarket or shopping mall packages and delivers the beer to the service desk, so that the user can pick up the beer at the service desk without having to go to the beer storage location for picking it up. This is convenient and fast and improves the user's shopping experience.

Further, the shopping system 700 in this embodiment includes a sensor provided on a shelf or built in the electronic price tag, which is used for recognizing a customer's behavior, and generating a trigger instruction when a recognition result meets a predetermined condition, and transmitting the trigger instruction to the electronic price tag.

Generally, the electronic price tag is arranged beside its corresponding first product. When the customer approaches the electronic price tag, for example, when the customer's proximity to the electronic price tag is smaller than a threshold (for example, 0.2 m), the sensor in the electronic price tag, such as an image sensor or an infrared sensor, recognizes this action and determines that the customer has an intention of purchasing the first product, which a predetermined condition. This determination result is a trigger instruction, and at this time, the electronic price tag will display at least one piece of second product information of the at least one second product for reference by the customer, so as to enhance smart shopping experience.

In addition, the sensor can be arranged on the shelf rather than in the electronic price tag. When a customer picks up the first product, the sensor on the shelf, such as an image sensor, a pressure sensor, or an ultrasonic sensor, recognizes this action, and determines that the customer has an intention of purchasing the first product, and transmits the determination result to the electronic price tag. The determination result is a trigger instruction, and at this time, the electronic price tag will display at least one piece of second product information of the at least one second product.

Figure 8:
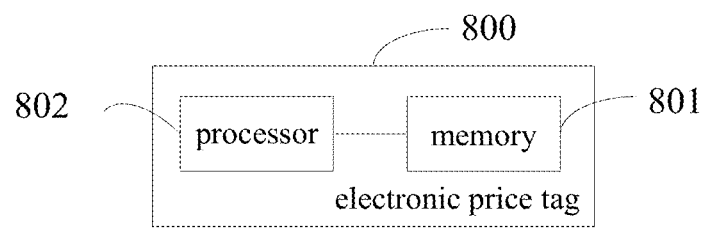
FIG. 8 is another structural diagram of an electronic price tag provided in embodiments of the present disclosure.

Reference is made to FIG. 8, which is a structural diagram of an electronic price tag provided in embodiments of the present disclosure. As shown in FIG. 8, the electronic price tag 800 includes, for example, a memory 801, a processor 802 and a computer program that is stored on the memory 801 and is operable on the processor 802. The processor 802 is configured to read the computer program in the memory 801 and execute the following procedures: displaying at least one piece of first product information of at least one first product in an area where the electronic price tag is located, the at least one piece of first product information including at least one of name information and price information of the at least one first product; and receiving a trigger instruction and displaying at least one piece of second product information of at least one second product, the at least one second product being at least one of at least one product each associated with the first product and having a discounted price, or at least one product each associated with the first product and having a discounted total price incurred when purchased together with the first product, and the at least one piece of second product information including at least one of name information, price information, and location information of the at least one second product.

Further, the processor 802 can further execute determining a target response object according to a position of the electronic price tag when receiving a first input operation; and transmitting a notification message to the target response object.

Further, the determining, by the processor 802, the target response object according to the position of the electronic price tag can include taking one of response objects obtained in advance, which is closest to the position of the electronic price tag, as the target response object, or taking one of response objects obtained in advance, which is arranged corresponding to the position of the electronic price tag, as the target response object.

Further, the displaying, by the processor 802, the at least one piece of second product information of the at least one second product can include: displaying a plurality of pieces of the second product information of a plurality of the second products sequentially when there is the plurality of the second products.

Further, the processor 802 can further execute switching the second product information of the second product which is currently displayed on the electronic price tag to the second product information of another one of the plurality of the second products when receiving a second input operation.

Further, the processor 802 can further execute displaying at least one piece of comments information of the second product which is currently displayed on the electronic price tag when receiving a third input operation.

Further, the at least one piece of second product information further includes at least one piece of scan code payment information of the at least one second product, and the or each piece of scan code payment information includes a two-dimensional code for payment provided for a mobile terminal.

It should be noted that the electronic price tag 800 in the above embodiment can realize any one of the method embodiments shown in FIGS. 1 to 4. That is, any one of the method embodiments shown in FIGS. 1 to 4 can be implemented by the electronic price tag of this embodiment, and same or similar advantageous effects can be achieved and will not be repeated here.

Embodiments of the present disclosure further provide a computer-readable storage medium, having a computer program stored thereon, wherein when executed by the processor, the computer program implements steps of the method for displaying product information as provided in the above embodiments.

The present disclosure has been described with reference to the flow charts and/or block diagrams of the method, the electronic price tag and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the trigger instruction receiver, the target response object determining device, the notification message transmitter, and the switcher are divided merely on the basis of their logic functions, and in actual use, they may be completely or partially integrated into a physical entity, or physically separated from each other. These parts/devices may be implemented by calling software through a processing element, or implemented in the form of hardware. For example, the trigger instruction receiver may be a processing element arranged separately, or integrated into a chip of the above-mentioned device. In addition, it may be stored in the memory of the above-mentioned device in the form of a program code, and may be called and executed by a processing element of the above-mentioned device so as to achieve the above functions. The other parts/devices may be implemented in a similar manner. All or parts of the devices may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above parts/devices may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain part/device is implemented by calling a program code through a processing element, the processing element may be a general-purpose processor, e.g., a Central Processing Unit (CPU) or any other processor capable of calling the program code. These parts/devices may be integrated together and implemented in the form of system-on-a-chip (SOC).

Although the embodiments are described above, a person skilled in the art may make modifications and alterations to these embodiments in accordance with the basic concept of the present disclosure. So, the attached claims are intended to include the embodiments and all of the modifications and alterations that fall within the scope of the present disclosure.

It should be further appreciated that, such words as "first" and "second" are merely used to separate one entity or operation from another entity or operation, but are not necessarily used to represent or imply any relation or order between the entities or operations. In addition, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above are optional embodiments of the present disclosure. It should be noted that, for those of ordinary skill in the art, several improvements and modifications can be made without departing from the principles described in the present disclosure, and shall also be regarded as falling within the protection scope of the present disclosure.

What is claimed is:

1. An electronic price tag, comprising:
   a first display, configured to display at least one piece of first product information of at least one first product in an area where the electronic price tag is located, the at least one piece of first product information comprising at least one of name information and price information of the at least one first product;
   a trigger instruction receiver, configured to receive a trigger instruction and transmit a display instruction according to the trigger instruction; and
   a second display, configured to respond to the display instruction and display at least one piece of second product information of at least one second product, the at least one second product being (i) at least one product each associated with the first product and having a discounted price, or (ii) at least one product each associated with the first product and having a discounted total price incurred when purchased together with the first product, and the at least one piece of second product information comprising at least one of name information, price information, and location information of the at least one second product,
   wherein the location information comprises a two-dimensional code of a destination address where the second product is stored, and
   wherein the at least one piece of second product information further comprise at least one piece of scan code payment information of the at least one second product, and the or each piece of scan code payment information comprises a two-dimensional code for payment provided for a mobile terminal.

2. The electronic price tag according to claim 1, wherein the at least one piece of first product information comprise the name information and the price information of the at least one first product.

3. The electronic price tag according to claim 2, wherein the at least one piece of second product information comprise the name information, the price information, and the location information of the at least one second product.

4. The electronic price tag according to claim 1, further comprising:
   a target response object determining device, configured to determine a target response object according to a position of the electronic price tag when receiving a first input operation; and
   a notification message transmitter, configured to transmit a notification message to the target response object.

5. The electronic price tag according to claim 4, wherein the target response object determining device is further configured:

to take one of response objects obtained in advance, which is closest to the position of the electronic price tag, as the target response object; or to take one of the response objects obtained in advance, which is arranged corresponding to the position of the electronic price tag, as the target response object.

6. The electronic price tag according to claim 1, wherein the second display is further configured to display a plurality of pieces of the second product information of a plurality of the second products sequentially when there is the plurality of the second products.

7. The electronic price tag according to claim 6, further comprising:
a switcher, configured to switch the second product information of the second product which is currently displayed on the electronic price tag to the second product information of another one of the plurality of the second products when receiving a second input operation.

8. The electronic price tag according to claim 1, further comprising:
a comments information display, configured to display at least one piece of comments information of the second product which is currently displayed on the electronic price tag when receiving a third input operation.

9. The electronic price tag according to claim 1, wherein the trigger instruction is obtained by a sensor provided in the electronic price tag or on a shelf.

10. A method for displaying product information for an electronic price tag, wherein the electronic price tag comprises a first display, a trigger instruction receiver, and a second display, the method comprising:
displaying, by the first display, at least one piece of first product information of at least one first product in an area where the electronic price tag is located, the at least one piece of first product information comprising at least one of name information and price information of the at least one first product; and
receiving, by the trigger instruction receiver, a trigger instruction, and displaying, by the second display, at least one piece of second product information of at least one second product, the at least one second product being (i) at least one product each associated with the first product and having a discounted price, or (ii) at least one product each associated with the first product and having a discounted total price incurred when purchased together with the first product, and the at least one piece of second product information comprising at least one of name information, price information, and location information of the at least one second product,
wherein the location information comprises a two-dimensional code of a destination address where the second product is stored, and
wherein the at least one piece of second product information further comprise at least one piece of scan code payment information of the at least one second product, and the or each piece of scan code payment information comprises a two-dimensional code for payment provided for a mobile terminal.

11. The method according to claim 10, wherein the at least one piece of first product information comprise the name information and the price information of the at least one first product.

12. The method according to claim 11, wherein the at least one piece of second product information comprise the name information, the price information, and the location information of the at least one second product.

13. The method according to claim 10, further comprising:
determining a target response object according to a position of the electronic price tag when receiving a first input operation by the trigger instruction receiver; and
transmitting, by the trigger instruction receiver, a notification message to the target response object.

14. The method according to claim 13, wherein the determining the target response object according to the position of the electronic price tag comprises:
taking, by the electronic price tag, one of the response objects obtained in advance, which is closest to the position of the electronic price tag, as the target response object; or
taking, by the electronic price tag, one of response objects obtained in advance, which is arranged corresponding to the position of the electronic price tag, as the target response object.

15. The method according to claim 10, wherein the displaying the at least one piece of second product information of the at least one second product comprises:
displaying, by the second display, a plurality of pieces of the second product information of a plurality of the second products sequentially when there is the plurality of the second products.

16. The method according to claim 15, wherein the electronic price tag further comprises a switcher, the method further comprising:
switching, by the switcher, the second product information of the second product which is currently displayed on the electronic price tag to the second product information of another one of the plurality of the second products when receiving a second input operation.

17. The method according to claim 10, wherein the electronic price tag further comprises a comments information display, the method further comprising:
displaying, by the comments information display, at least one piece of comments information of the second product which is currently displayed on the electronic price tag when receiving a third input operation.

18. The method according to claim 10,
wherein the trigger instruction is obtained by a sensor provided in the electronic price tag or on a shelf.

* * * * *